April 9, 1929.  G. F. HURT  1,708,179

GAS AND LIQUID TREATMENT

Filed July 3, 1923  3 Sheets-Sheet 1

Inventor
George F. Hurt,
By Rogers, Kennedy & Campbell
Att'ys.

April 9, 1929.                G. F. HURT                1,708,179
                          GAS AND LIQUID TREATMENT
                   Filed July 3, 1923         3 Sheets-Sheet 2
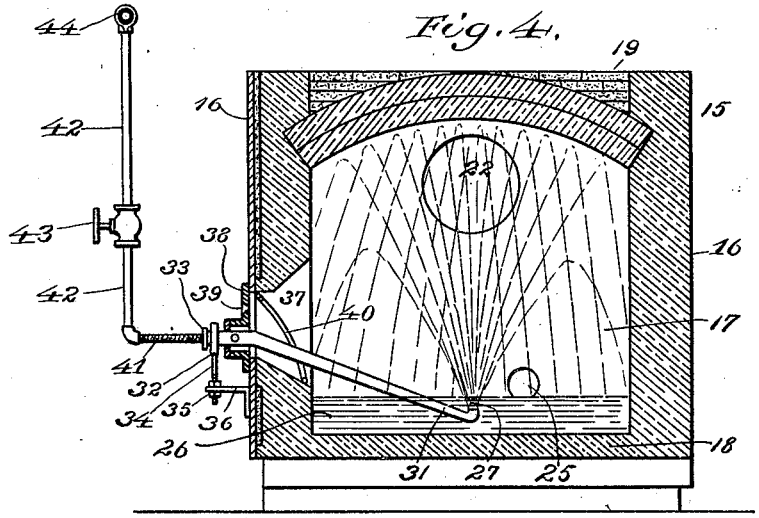
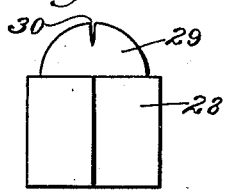
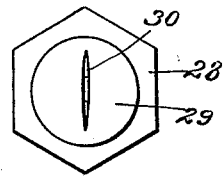
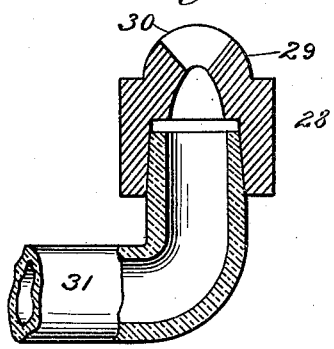

April 9, 1929.  G. F. HURT  1,708,179
GAS AND LIQUID TREATMENT
Filed July 3, 1923    3 Sheets-Sheet 3

Inventor
George F. Hurt,
by Rogers, Kennedy & Campbell,
Attys.

Patented Apr. 9, 1929.

1,708,179

UNITED STATES PATENT OFFICE.

GEORGE F. HURT, OF ATLANTA, GEORGIA, ASSIGNOR TO GEORGE F. HURT ENGINEERING CORPORATION, OF NEW YORK, N. Y., A CORPORATION OF NEW YORK.

GAS AND LIQUID TREATMENT.

Application filed July 3, 1923. Serial No. 649,275.

This invention relates to the subject of gas and liquid treatment, involving a new art or process for effecting intimate contact between the gases and liquids, for various purposes. The principles of the present invention are applicable for numberless reactions or treatments, of the gas by the liquid, or of the liquid by the gas, or both, such as chemical, thermal, mechanical or electrical treatments, or any two or more, or all thereof. Thermal treatments involve the transfer of heat units from one to the other, for cooling the one or heating the other, or for condensation, vaporization, concentration or other purposes. Mechanical treatments may include physical absorption or solution by one of the other or portions thereof, or the transfer of material, for cleansing or recovery purposes, for the precipitation of dust and other solids from gases, the absorption of gases, the separation or combination of materials, etc.

The field of utility of the present invention is very wide or universal where gas and liquid treatment or contact is involved.

Among the general objects and advantages of the present invention are the following: direct, intimate and thorough distribution or contact between the gas and liquid and without incurring substantial suspension of the liquid, or the entrainment or carrying away of suspended liquid with the gases; acceleration of any desired reactions by increasing enormously the extent of contact without incurring liquid suspension or entrainment such as would defeat or render impractical the reactions; treatment of large volumes of gas by the use of a small volume of liquid, and vice versa; reduction in the size of the apparatus for a given capacity, and reduction in cost of installation; ready observation and adjustment, and quick control of operations, and quick response to adjustment, so as to permit intelligent regulation of operations with minimum of attention; low power requirement for operation of apparatus; easy accessibility to all parts of apparatus and possibility of cleaning without substantial interruption.

The present invention rests upon the discovery that a submerged upward discharge of air or other gas into liquid may be controlled upon certain principles so as to throw the liquid extensively upward into the superimposed gases in the form of drops only, of substantial size, so that all of the liquid is compelled to fall or return to the pool, practically avoiding entrainment and the described objections thereto. To distinguish this new result from a mere spray, which may involve mist and entrainment, the terms "fountain" or "geyser" are adopted, indicating such upward projection of the liquid in the form of drops of substantial size only. The present discovery enables the practical embodiment of this "pool and fountain" system in various arts and industries to enable intimate and direct and extensive gas and liquid contact and treatment under intelligent control. It will be understood that the liquid drops after traversing the space occupied by the super-imposed gases will return to the body of liquid, either to the portion or pool from which the fountain was projected, or perhaps to an adjacent portion in the case of a system involving progression of the liquid during continuous operations. By the application of the principles described it is possible to restrict the reaction between the gases and liquids to the chemical reaction of one upon the other, and to the delivery of thermal units from one to the other, and to the physical absorption or transfer of a portion of one to the other, and to the vaporization or condensation of portions one by the other, and to eliminate the total carrying away in liquid form of any portion of the liquid by the flowing gases.

By drops of substantial size it will be understood from the above that the drops are intended to be sufficiently large and heavy to avoid being suspended in the passing gases, the drops therefore being non-entrainable and such as to return by gravity to the pool. The projected drops may be described as constituting a non-atomizing fountain of drops too large to be entrained and carried away. The elements should be so adjusted as to produce a fountain of this sort. The exact size of the drops of liquid can not be specified as the same are dependent on the character of the liquid, but without intending to limit the invention, a contrast may be drawn somewhat as follows. An atomized or entrainable particle may be as large as about 1/100 of an inch diameter, more or less. The drops of the present invention will be of a minimum size of substantially 1/10 inch diameter, more or less. Much smaller than this diameter would too nearly approach the entrainable size. The minimum practical size to avoid entrainment might vary from the size of BB shot to #16 shot, dependent upon the velocity of the passing gases.

In the accompanying drawings Figs. 1 to 7 indicate a form of apparatus with which the principles of this invention may be practised, while Figs. 8 to 13 are diagrams explanatory of the mode of action and control, namely:

Fig. 4 is a transverse section thereof; corresponding with Fig. 9 of the copending application.

Fig. 5 is an enlarged elevation of a particular form of nozzle suitable for the purposes, and Figs. 6 and 7 are a central vertical section and a plan view thereof respectively; corresponding with Figs. 18, 19 and 20 of said copending application.

Figure 1:
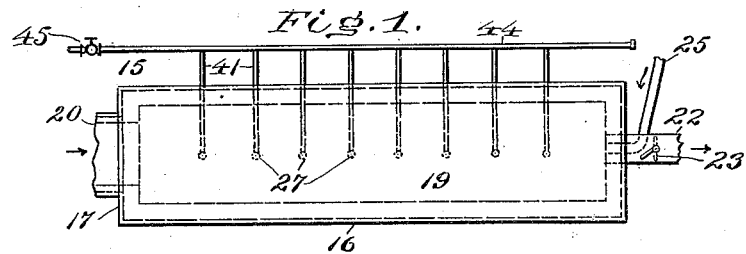
Fig. 1 is a plan view of such an apparatus; this corresponding with the second section or unit, as shown in Fig. 1A, of copending application Serial Number 606,014, being the section of apparatus in which the denitration step takes place in the manufacture of sulfuric acid by the nitration system, a convenient subject with which to illustrate the principles hereof.

The apparatus may take an endless variety of forms, the one shown in Figs. 1 to 7 being selected merely for convenience, this comprising a casing, section or unit 15, which may be in the nature of a flue or chamber or other enclosure, containing a space for the gases, with provision for a pool or pools of the liquid. In the copending application Serial Number 606,014 this section or unit is the second one in a series of sections or units, and is the one in which the step of denitration takes place in the manufacture of sulfuric acid. The gases may contain $SO_2$ and $O$ and $H_2O$ etc., and the liquids may contain $H_2SO_4$ and $NHSO_5$ and $H_2O$, etc. The reaction is that $NHSO_5$ is denitrated and yields $H_2SO_4$, this being brought about by the contact between the gases and liquid, under the existing conditions, the resulting liquid, carrying increased amount of $H_2SO_4$, progressing to the left, and the remaining or resulting gases progressing to the right, as indicated by the arrows. The complete reactions may be ascertained by reference to the copending case, the present case dealing principally with the process and apparatus by which the desired gas and liquid contact for purposes of treatment is brought about. The source of the gaseous and liquid agents will appear in the copending case, as well as many other details unnecessary to elaborate here.

The flue, chamber or enclosure 15 may be built up of front and rear side walls 16, end walls 17, floor 18, and top wall 19, all of which may be composed of suitable material such as chemical brick, which may be surrounded with insulating means if the heat is to be conserved, although a cooled apparatus may often be desirable as disclosed in other sections or units in the copending case.

A conduit or connecting flue 20 admits the gases to the apparatus. The interior of this connecting flue at its bottom portion, marked 21, constitutes a channel, a convenient means by which liquid may be conducted from the apparatus, although it might be drawn off in other ways, by a separate duct, over a weir, through the fountaining action or otherwise.

The gases may pass out of the enclosure by an exit flue 22, which may be provided with a damper 23 to regulate flow, and at a suitable point may be provided a fan or suction means 24 to produce or maintain gas flow.

Figure 2:
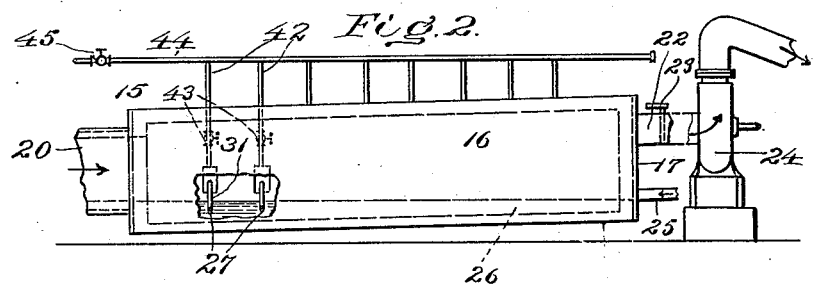
Fig. 2 is a front elevation of the apparatus shown in Fig. 1; corresponding with part of Fig. 2A of said copending application.
Figure 3:
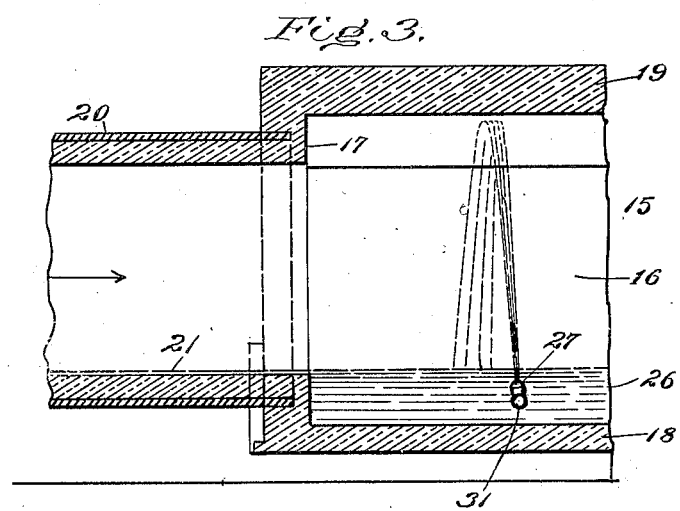
Fig. 3 is a central vertical longitudinal section of the same; corresponding with part of Fig. 5 of the copending application.

The liquid may be admitted to the enclosure by a duct 25, a pool 26 being maintained by the shape of the enclosure bottom, its depth preferably predetermined, as by an overflow means, such as the channel 21 formed by the lower part of conduit 20 as already stated. The entire flue or casing is shown in Fig. 2 as slightly tilted toward the liquid exit.

The principle of this invention involves the projecting of the liquid from the pool into the gas in the enclosure or space in the form of a fountain of drops, this being shown accomplished by means of a series of submerged air or gas nozzles 27 with provision for the supply of air or gas to the nozzles at a pressure which may be regulated, and each nozzle being submerged and directed upwardly and having provision for adjusting the depth of submergence. By this means and these adjustments the features of the present invention are attained.

In the specific embodiment being described, having to do with the manufacture of sulfuric acid, each nozzle may be made of non-corrosible material, and may have the special shape indicated in Figs. 5, 6 and 7 for the purpose of giving an effective fountaining action of such form as substantially to occupy the cross section of the space or flue above the liquid. Each nozzle 27 may be composed of regulus metal or other non-corrosible material and is shown formed with a body portion 28 having at the top a dome 29 provided with an orifice 30 in the shape of a narrow slot partaking of the arched shape of the dome. This efficient form of slot is somewhat wider at the middle than at the two ends, which taper to points. This nozzle gives an effective fan-shaped fountain of drops adapted substantially to fill the cross section of the flue, as indicated in Fig. 4. The air pipe 31 leading to and supporting the nozzle may be composed of pyrex glass, which is non-corrosible and not subject to injury from the heat. The extremity of the pipe is curved upwardly and has the nozzle fitted suitably to it.

The adjustment of depth of submergence of each nozzle may be effected by raising and lowering it, for example by swinging the carrying pipe 31 about a pivot 32 arranged in or near one of the walls 16. The pipe is shown with its outer extremity 33 extending beyond the pivot, thus permitting adjustment, for example through a threaded link 34 engaged by nuts 35, which in turn engage above and below a fixed bracket 36. Operating the nuts gives minute adjustment of submergence.

To accommodate the swinging pipe 31 the wall is formed with a recess 37, which is shown closed by a flanged plate 38, which carries the pivot 32, and the plate may be provided with a peep hole 39 for observation and adjustment of operations. A slotted interior plate 40 permits observation and adjustment while protecting the mechanism from liquid.

Air or gas may be supplied to the pipe and nozzle through any suitable exterior connections, including for example, the flexible pipe section 41, such as a rubber hose, which in turn is connected by a pipe 42, having a valve 43, with an air pressure main 44. The valve 43 gives the necessary adjustment of air pressure to each of the nozzles. Regulation of the air pressure for all of the nozzles can be effected by a valve 45 in the air main.

The apparatus may be indefinitely varied in design, structure or arrangement, and indeed, these matters as shown are not essentials in the broad aspect of the invention as the principles might be practised with apparatus old in itself if modified, fitted, adjusted and operated according to the present invention. The invention could be practised, but not to full advantage, in an apparatus having no progress of gases or liquid, or having progress of only one of them, by a system of batch treatment. Progression of gas or liquid is preferable but is not necessarily continuous or steady. Liquid progress is herein indicated as gravity progress, but it might be a forced progress or flow, or the fountaining action may be utilized to afford progress from one pool or portion to another as explained in connection with Figs. 16 or 17 of said copending case. A tilted fountain will promote liquid progress. The fountain in Fig. 3 hereof is tilted toward the gas entrance and liquid exit. This further tends to prevent the fountained liquid being carried backward by the effect of the gas flow upon the fountain, as would occur with a vertical fountain. The nozzles and fountains may be in any number and distributed in many ways, for example at longitudinal intervals as shown, in successive pool portions. By "pool" herein it is intended to include any body or portion of the liquid, suitably contained or supported, which may be considered separately, whether or not there be separation from adjacent liquid. By "stream" of liquid is intended the liquid progressing in any manner through the prescribed course or route. By "opposite" flow as between the gases and liquid it is intended to include any generally opposite progress as distinguished from the two passing through the same sections in the same order. Sediment, in many cases, may collect at the bottom of pools or enclosures, and such solid material or "sludge" may be removed or drained, at intervals or otherwise, as explained in the copending case.

The attainment of the operation and results of this invention are dependent upon the actions taking place between the pool liquid and the nozzle gas beneath the surface of the pool. This invention takes advantage of the laws or principles involved in these actions and makes available the described geyser action, or fountain of drops, as the means of intertreatment between the pool liquid and the superimposed or passing flue gases. No set rule can be fixed for all conditions as there are many factors or variables affecting the result, some of which will now be referred to. One class of factor includes those determined by the art or industry and the available ingredients and conditions, such as the viscosity and specific gravity of the liquid, and the quantities, compositions and temperatures of the liquid and gases, also the character of the nozzle gas, which may frequently be atmospheric air. Another set of factors are those predetermined or selected in respect to the design, size, structure and arrangement of the apparatus and its parts, such as the design and size of the flue or enclosure, the velocity of the gases therethrough, controlled by dampers or otherwise, the arrangement of pools and the number and arrangement of fountains therein, and the character of the nozzle and orifice, as to shape, size, mounting with relation to this direction of gas flow and also with relation to the vertical, and the baffles if any in the flue or space containing gases. All such factors can advantageously be varied or selected for the special purpose at hand, and some could be adjustable in character, to afford control of operation. But preferably the final adjustments, or operating regulation, after the predetermination of the other factors, consists in varying the pressure of the nozzle gas and the depth of submergence of the discharge, in a manner to produce the geyser action or fountain of drops of substantial size, adapted substantially to occupy the cross section of the flue or space containing the superimposed gases, and preventing entrainment and suspension and the objections inherent therein.

As an example, with the denitration reaction in flue or section 15 hereof, and the conditions, quantities, compositions and temperatures as stated in the copending case, the interior dimensions of the flue being 60 inches wide and 60 inches high, and with a domed nozzle, having a tapered slot as shown, 7/8 inch long and 1/64 inch greatest width, it is found that a submergence of about 3/4 inch, with a nozzle air pressure of about 45 pounds per square inch, will give a fountain of drops as described and substantially occupying the space or flue.

The action may be approximately explained by the diagrams, Figs. 8 to 13, which however are much exaggerated and incomplete in character, and intended only to expound a theory, and not to limit the invention to the supposed action or theory, the invention being demonstratable in practise by the hereinabove disclosure.

Figure 8:
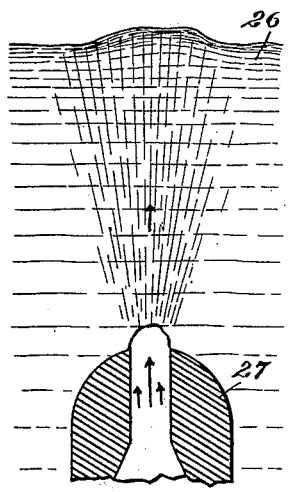
Figs. 8, 9 and 10 are a series of diagrams showing the probable approximate action with nozzle submergence according to this invention, resulting in the fountain or geyser of drops as explained.
Figure 9:
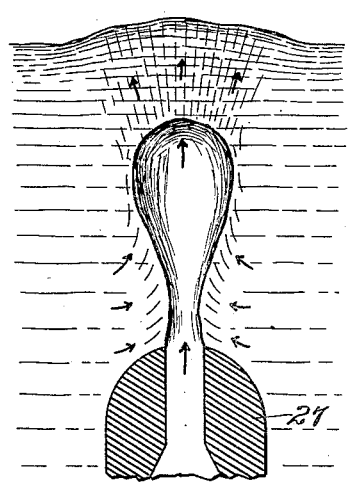
Figure 10:
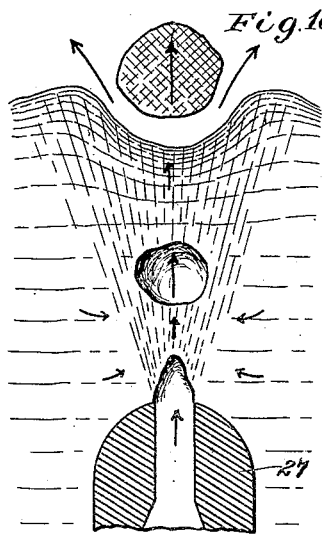
Figure 11:
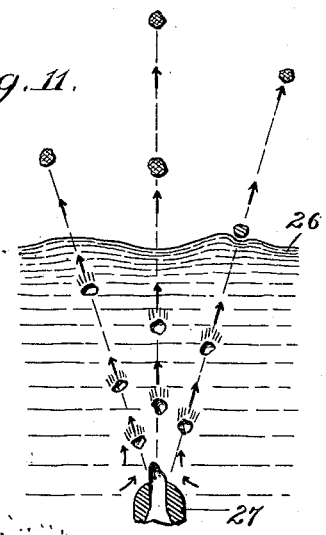
Fig. 11 is a diagram on a smaller scale indicating more completely the general action in producing the fountain of drops.
Figure 12:
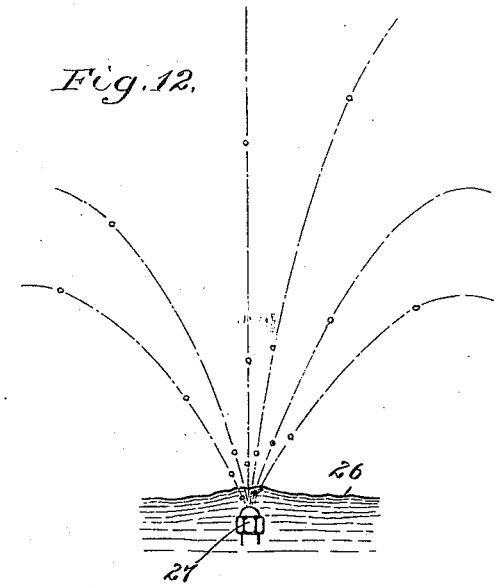
Fig. 12 is a diagram on a still smaller scale indicating the total fountaining action in cross section or in a single plane.

Figs. 8, 9 and 10, on large scale, are successive cross sections, with the submergence of nozzle 27 and gas pressure supposed to be properly adjusted, and indicating how a succession of liquid drops may be formed and projected from the pool 26. Fig. 11, on a smaller scale, carries the idea further, showing a number of lines of projection of drops, indicating the great number of drops that will be in the flue gas at any time. There may not be single-file processions of drops, or along fixed paths, but rather a constant succession along general lines or directions. Fig. 12, on a yet smaller scale, indicates diagrammatically the complete geyser, considered however in cross section, so that if a round nozzle orifice is used the diagram would have to be rotated to describe the entire effect. In the diagrams the arrows are intended to represent approximate directions of flow, and their comparative lengths the comparative velocities at different points.

Figure 13:
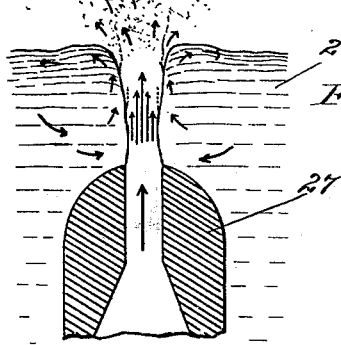
Fig. 13 is a diagram showing the effect of too slight a submergence of the air or gas nozzle, namely, a spray with atomization of the liquid and consequent entrainment.

Before describing the action in detail, Fig. 13 will be referred to, indicating the objectionable effect of insufficient submergence in relation to the nozzle gas pressure and other factors. When the nozzle is close to the surface, or the pressure excessive, a continuous gas duct forms through the liquid, as shown, and an unbroken stream of gas flows from the orifice to the gas in the flue above the liquid. The nozzle gas therefore is not really discharged into the liquid as with the present invention. The reason is that the small static head of the liquid about the nozzle is insufficient to press in and break the gas stream, the gas pressure forcing back the wall of liquid and keeping an open channel. Atomization, mist, and entrainment necessarily occur, because the action of the rapid gas current through the duct in the liquid is to tear off from the liquid surface minute particles and carry them up as a fine spray. It is analogous to a strong gale of wind upon the ocean. Waves form, and they increase as they advance, resulting in crests, which become tapered, and finally are shattered or torn asunder by the air motion and consequent friction due to high relative velocity, and the minute particles are carried along as entrained liquid or atomized spray. Often entrained spray or "mist" will be blown hundreds of feet inshore, wetting objects far from the water. This is believed to be the entraining action of Fig. 13, and is contrary to the present invention.

Referring to Figs. 8, 9 and 10, the nozzle is supposed to be submerged properly, and the liquid head sufficient to prevent the nozzle gas maintaining an open channel. A very different action from Fig. 13 thereby takes place. In Fig. 8 the gas is about to pass from the nozzle into the pool of liquid, directed upwardly. The pressure is communicated to the liquid through an area which may be roughly as marked by the up and down lines. The liquid flows up ahead of the rising gas, acquiring a velocity in the indicated area. The gas increases in quantity and rises toward the surface. A formation like Fig. 9 is believed to result. The static liquid head is enough to force the liquid inward close above the nozzle, the liquid assuming also an upward motion. The encroaching liquid is about to close together, cutting off a globule or capsule of gas above it. In this way the liquid cuts off the gas at intervals, the gas, at high velocity ascending as a series or procession of separate portions, not as a continuous stream. The action serves to accelerate the upward movement of the liquid between the nozzle and pool surface, this being further increased by the expansion of the gas as it rises. After each encroachment of liquid and formation of gas globule the action is repeated with the next portion of the gas. Between the gas portions are a series of liquid portions, ascending with rapidly increasing velocity and acceleration. Fig. 10 shows one of these alternate liquid portions or drops leaving the pool with upward velocity, its supporting and propelling gas being released laterally. The pool surface is distorted concavely, contrary to its alternate convex distortion in the stage of Fig. 9. Below the surface in Fig. 10 is another portion of ascending liquid, followed by another gas portion, a succeeding liquid portion, and then the new portion of gas issuing from the nozzle.

It will be understood that these actions take place with substantial velocity and great rapidity of succession, and along numerous lines or general paths, giving a fountain consisting of many streams of successive drops. These drops cannot be atomized, or split to the point where they can entrain, for the following reasons. The ascending gas is not a stream travelling with high relative velocity along a liquid surface as in Fig. 13, and there will be no such tearing action as therein. On the other hand the gas, having no free duct through the liquid, can only push it ahead, giving much of its own energy to comparatively large masses of liquid. This both reduces the energy in the gases and increases the velocity of such liquid bodies. Finally, when the pool surface is reached by the liquid portion and the gas capsule behind it, the two are travelling at nearly the same velocity, so that the relative velocity is negligible and the released gas is incapable of atomizing the liquid. In one sense the essential distinction between the action of the present invention and a atomizing action as in Fig. 13 is one of relative velocity between the nozzle gas and pool liquid. With the low submergence of Fig. 13 the relative velocity of the gas is high, and fine particles are whipped out of the liquid walls of the gas channel and blown into the flue gas. In this invention the liquid is accelerated upwardly in successive portions, so that as the liquid and gas portions come to the surface there is substantially no relative velocity, hence no atomizing or entraining. The principle is involved that travelling gas will not cut off particles small enough to entrain from a liquid unless the relative velocity is high. Control and adjustment to take advantage of this and produce the geyser effect of this invention, or fountain of drops, without entrainment, is believed to be new.

The multiplicity of drops rise into the gas space and descend by gravity to the pool, some through the gases, some along the walls, and the steady, extensive and well distributed processions of drops afford a most thorough and intimate contact and intertreatment with the gases in the space above the pool.

The present apparatus is of such character as to afford intelligent and satisfactory observation, test and regulation of the actions and reactions. This is due in part to the fact that successive stages of reaction are located consecutively in the apparatus and therefore independently observable and controllable, each portion of the apparatus being completely accessible for the testing of temperatures, compositions, rates of flow, etc. The relatively small volumes of liquid and gas at any one point or stage ensures quick response of the reactions to any adjustments, and therefore more effectual control and regulation. A very important feature is the immediate and effectual control of contact and the intimacy thereof by increasing, reducing or cutting off the air supplied to any one or more of the fountain nozzles. The use of dampers permits the gas flow to be stabilized or to be retarded as desired. The present invention permits the use of peep-holes or windows so as to give observation of all actions at all desired points or stages, thus assisting in the regulation of the fountains.

It will thus be seen that there has been described a new art, process or system of gas and liquid treatment or contact, as well as a new apparatus, embodying the principles and attaining the objects of the present invention. Since many matters of operation, process, construction, combination, arrangement and detail may be variously modified without departing from the principles involved, it is not intended to limit the invention to such matters except in so far as set forth in the appended claims.

What is claimed is:

1. The art or process of gas and liquid treatment comprising maintaining a body of the liquid with the gas superimposed thereover, and discharging upwardly gas under pressure at a submerged point in the liquid, with such depth of submergence and pressure of discharge as to project the liquid into the gas in the form of a non-atomizing fountain of drops of larger than entrainable size and returnable by gravity to the body of liquid.

2. The art or process as in claim 1 and wherein the body of liquid is caused to flow progressively during treatment and wherein the discharge of gas is maintained at a series of submerged points arranged at spaced intervals along the course of liquid flow.

3. The art or process as in claim 1 and wherein the fountaining action is determined by cooperative regulation of the depth of submergence and pressure of discharge of gas, with a depth of submergence sufficient to afford a liquid head to press in and cut off portions of ascending gas, whereby an open gas channel to the liquid surface is prevented, and the liquid is caused to accelerate toward the surface and project into the superimposed gas whereby high gas velocity relative to the liquid is prevented.

In testimony whereof, I have affixed my signature hereto.

GEORGE F. HURT.